(12) United States Patent
Carruth

(10) Patent No.: US 7,104,321 B2
(45) Date of Patent: Sep. 12, 2006

(54) DOWNHOLE GAS/LIQUID SEPARATOR AND METHOD

(76) Inventor: Don V. Carruth, 3310 W. Country Rd. 184, Midland, TX (US) 79706

( * ) Notice: Subject to any disclaimer, the term of this patent is extended or adjusted under 35 U.S.C. 154(b) by 261 days.

(21) Appl. No.: 10/688,677

(22) Filed: Oct. 17, 2003

(65) Prior Publication Data

US 2005/0081718 A1     Apr. 21, 2005

(51) Int. Cl.
    *E21B 43/38*     (2006.01)
(52) U.S. Cl. .................................... 166/265; 166/105.5
(58) Field of Classification Search ................ 166/265, 166/105.5, 105.6
    See application file for complete search history.

(56) References Cited

U.S. PATENT DOCUMENTS

| | | |
|---|---|---|
| 1,665,540 A | 4/1928 | Green |
| 2,525,233 A | 10/1950 | Miller |
| 2,883,940 A | 4/1959 | Gibson |
| 3,791,444 A | 2/1974 | Hickey |
| 4,366,861 A | 1/1983 | Milam |
| 4,386,654 A | 6/1983 | Becker |
| 4,676,308 A | 6/1987 | Chow et al. |
| 5,653,286 A | 8/1997 | McCoy et al. |
| 6,234,248 B1 | 5/2001 | Knight |
| 6,237,691 B1 | 5/2001 | Kelley et al. |
| 6,357,530 B1 | 3/2002 | Kennedy et al. |
| 2002/0023750 A1 | 2/2002 | Lopes et al. |
| 2004/0238179 A1* | 12/2004 | Murray et al. ............... 166/369 |

* cited by examiner

*Primary Examiner*—William Neuder
(74) *Attorney, Agent, or Firm*—Grady K. Bergen

(57) ABSTRACT

A gas/liquid separator assembly for use in a tubing string located in a borehole of a well is provided. The separator assembly includes a tubular outer conduit having a lower inlet for introducing gas and liquids within the interior of the outer conduit. The outer conduit has an upper outlet to allow fluids to pass to the exterior of the outer conduit. A tubular inner conduit is disposed within the interior of the outer conduit. The inner conduit has a flow passage and an inlet for introducing liquids discharged from the outer conduit into the flow passage. The inner and outer conduits are rigidly joined together at a first end. An adaptor engages the inner and outer conduits at a second end to prevent lateral movement of the second end of the inner conduit within the outer conduit, while allowing relative longitudinal movement of the outer and inner conduits from longitudinal compression or tension forces applied to the outer conduit.

21 Claims, 3 Drawing Sheets

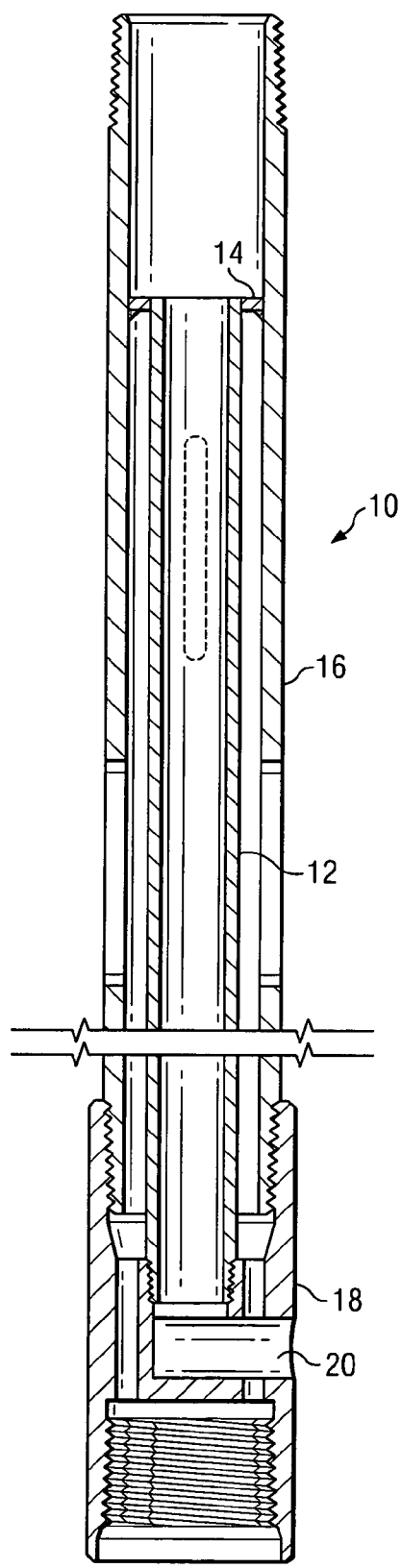
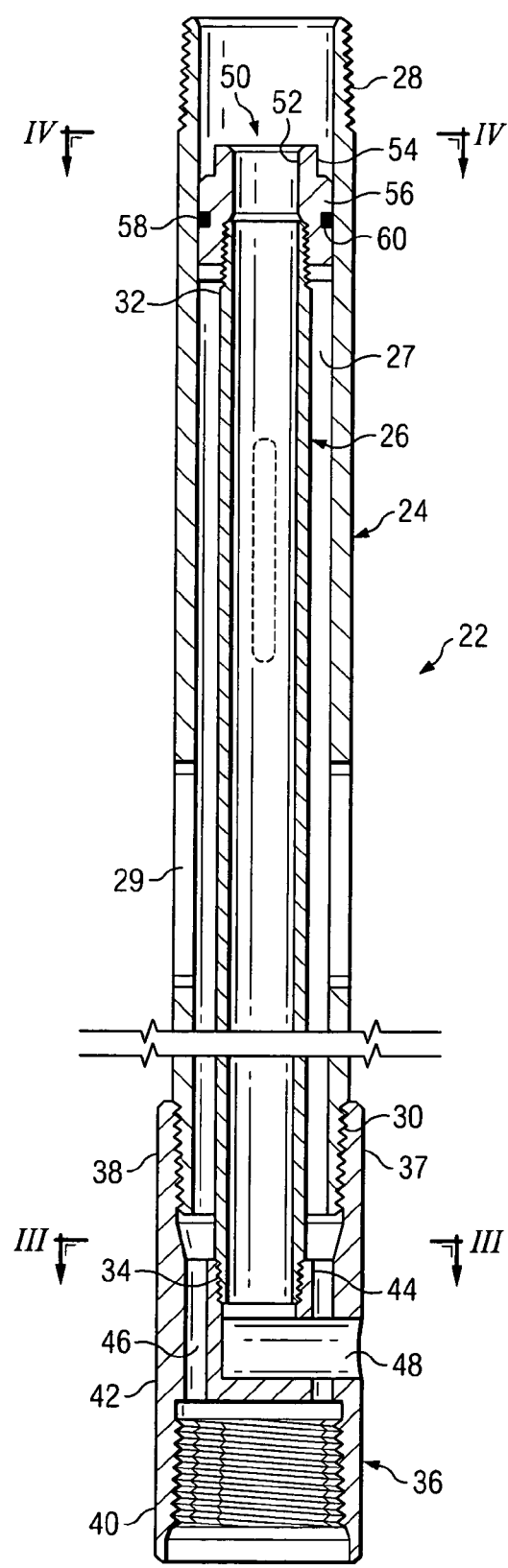
FIG. 1
(PRIOR ART)
FIG. 2

DOWNHOLE GAS/LIQUID SEPARATOR AND METHOD

TECHNICAL FIELD

The invention relates generally to downhole devices used in wells of subterranean formations, and in particular to devices for the separation of liquids and gases in such wells.

BACKGROUND

In oil and gas wells, both liquids and gases may be produced from the same well. In such wells, it is often desirable to separate gases and liquids so that the liquids may be more efficiently pumped or lifted to the surface. Gases that may be entrained or evolved from hydrocarbon liquids when such liquids are pumped to the surface may interfere or reduce the efficiency of the pumping operations, decreasing or slowing production.

There have been a variety of different methods and devices used for such downhole separation of liquids and gases. One such separator device 10 is shown in FIG. 1 and includes a tube 12 that is positioned within and welded at one end by means of a plate or annular ring 14 to the interior of a larger diameter tube 16. The larger diameter tube 16 is subsequently attached (screwed) at its upper end to a tubing string that extends into the well borehole from the surface. The larger diameter or outer tube 16 may be ported or slotted at its upper end to allow liquids and gases that are introduced into the outer tube to escape into the borehole or casing. The lower end of the inner and outer tubes 12, 14 are coupled together by a sub or coupling 18, which may, in turn, couple to a packer (not shown) that anchors the tubing string within the well. The packer forms a sump area where liquids, which fall back into the wellbore after being discharged from the outer tube 16, are drawn through a port 20 into the inner tube 12 and pumped to the surface.

In the arrangement described above, tension may be pulled from the surface on the tubing string, which is anchored in the wellbore. Such tension is pulled to eliminate buckling and flexing of the tubing string. Such tension may also result in the premature wear and failure of the pumping components.

When tension is pulled on the tubing string, prior art separator devices, such as the one described, are prone to failure. In particular, the inner tube is prone to fracture because of its rigid attachment to the outer tube. Additionally, because the inner tube is welded or permanently joined to the outer tube, repair or replacement of components of the device may be difficult or impractical.

BRIEF DESCRIPTION OF THE DRAWINGS

For a more complete understanding of the present invention, reference is now made to the following descriptions taken in conjunction with the accompanying figures, in which:

FIG. 1 is a longitudinal cross-sectional view of a prior art separator device;

FIG. 2 is a longitudinal cross-sectional view of a separator device, constructed in accordance with the invention;

DETAILED DESCRIPTION

Figure 3:
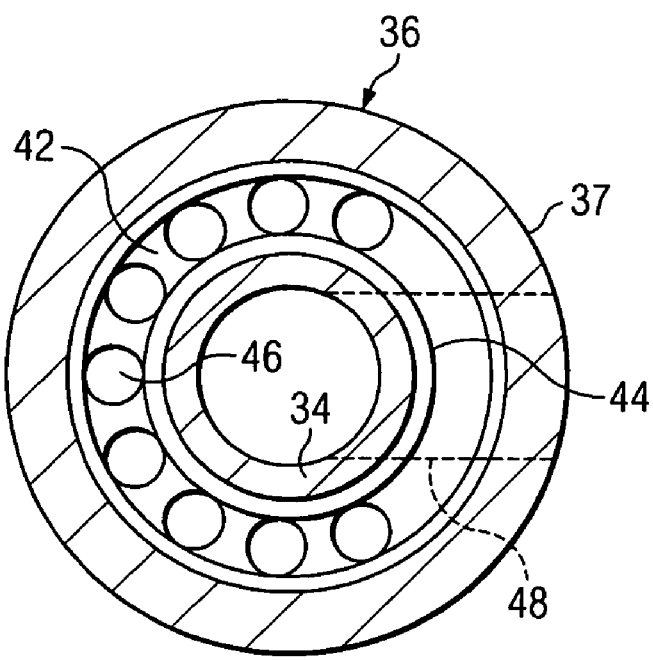
FIG. 3 is a transverse cross-sectional view of the separator device of FIG. 2 taken along the lines III—III.

Referring to FIG. 2, a gas/liquid separator 22 is shown having a tubular outer conduit 24 and an inner conduit 26 disposed within the interior of the outer conduit 24. An annular space 27 is defined between the outer and inner conduits 24, 26. The outer conduit 24 is in the form of an elongate tubular body having an upper end 28 that is provided with external helical threads for coupling to an upper extending tubing string portion or other member having a corresponding female threaded portion. The lower end 30 of the outer conduit is also provided with external helical threads. It should be readily understood by those skilled in the art that although various components of the embodiment are shown and described herein as having external or internal threads or that may be of a female or male configuration to facilitate coupling to other components, such construction is merely for exemplary purposes. In most cases, the components could just as readily be configured otherwise, with a female configuration being changed to a male configuration, and vice versa.

Formed in the upper portion of the outer conduit 24 are one or more ports or openings 29. The ports 29 may be in the form of longitudinal, elongated slots or openings that allow the passage of fluids between the interior and exterior of the outer conduit 24.

The inner conduit 24 is also formed as an elongate tubular body having upper and lower ends 32, 34, respectively. The upper and lower ends 32, 34 are each provided with external helical threads.

Although the diameters of the outer and inner conduits 24, 26 may vary, tubing sizes of from 1½ to 4 inches may be suitable for the tubular body of the outer conduit. Tubing sizes of from ¾ to 3 inches may be suitable for the tubular body of the inner conduit. In one particular embodiment, one inch tubing is used for the inner conduit and 2⅜ inch tubing is used for the outer conduit. These sizes may vary depending upon the application and well for which they are used, however, and should not be limited to any particular size.

A tubular sub or coupling 36 is provided for coupling to the lower ends 30, 34 of the outer and inner conduits 24, 26, respectively. The coupling 36 may be formed from a single, integral piece of material, as shown, or it may be formed in two or more pieces. The coupling 36 has a tubular wall 37 with an upper end portion 38 configured with threads for coupling to the threaded portion 30 of the outer conduit 24. The lower end 40 of the coupling 36 is also provided with an internally threaded or female coupling portion for coupling to a lower extending tubing string portion or other member having a corresponding male threaded portion.

The coupling 36 has a ported midsection 42 that extends across the interior of the tubular wall 37. The midsection 42 of the sub 36 has an inner coupling portion 44 for coupling to the lower end 34 of the inner conduit 26. The coupling portion 44 is provided with helical threads for engaging the helical threads of the lower end 34 of the inner conduit 26. The coupling 36 rigidly couples the outer and inner conduits 24, 26 together, with the ported midsection 42 isolating fluid flow to the outer and inner conduits 24, 26. In the embodiment shown, the inner conduit 26 is held within the coupling portion 44 so that it is substantially concentric with the outer conduit 24. The inner conduit 26 may be eccentrically located within the interior of the outer conduit 24, as well.

Referring to FIG. 3, the midsection 42 of the sub 36 is provided with one or more longitudinally extending ports 46 that are in fluid communication with the upper and lower ends 38, 40 so that fluid directed from the lower end 40 of the coupling 36 is directed into the lower end of the outer conduit 24, which is coupled thereto. In the embodiment shown, a plurality of the ports 46 are provided, which are circumferentially spaced apart about the coupling portion 44. The ports 46 extend less than the entire circumference to accommodate a transverse port 48 that is formed in the midsection 42 and that extends from the exterior of the tubular wall 37 to the coupling portion 44. The port 48 is in fluid communication with the inner conduit 26 coupled to the coupling portion 44 of the midsection 42 to direct fluids from the exterior of the coupling 36 into the inner conduit 26.

Figure 4:
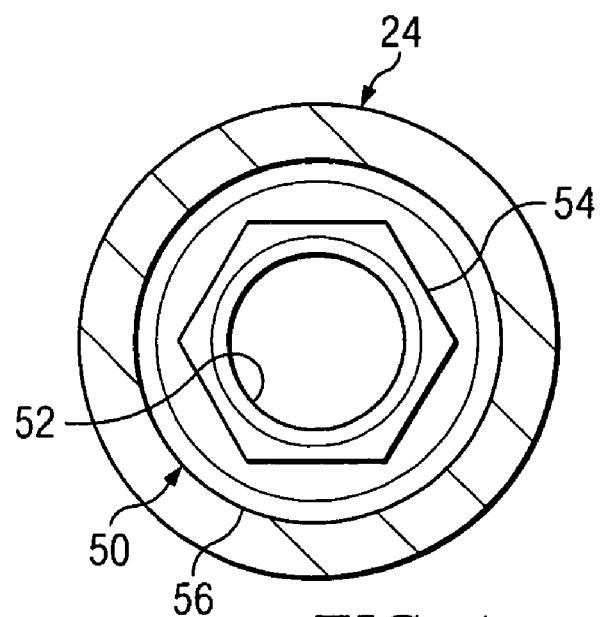
FIG. 4 is a transverse cross-sectional view of the separator device of FIG. 2 taken along the lines IV—IV.

Coupled to the upper end 32 of the inner conduit 26 is an adaptor 50. The adaptor 50 is provided with an internal bore 52. The lower end of the bore 52 is provided with internal threads for coupling engagement to the threaded upper end 32 of the inner conduit 26. The adaptor 50 includes a head 54 and a main body 56. The head 54 of the adaptor 50 may be configured for engagement with a wrench or other tool to facilitate screwing or coupling of the adaptor 50 to the upper end 32 of the conduit 26. Referring to FIG. 4, in the embodiment shown, the head 54 is hexagonal-shaped.

The body 56 of the adaptor 50 may be cylindrical in shape and sized to be closely received within the cylindrical interior of the outer conduit 24. One or more annular channels may be formed in the body 56 for receiving annular seal members or O-ring seals 60. The seal 60 may be an elastomeric material that is carried by the adaptor 50 and facilitates sealing engagement of the adaptor 50 with the outer conduit 24, so that fluid is prevented from passing through the annular space 27 at the upper end 28 between the inner conduit 26 and the outer conduit 26. The adaptor 50 engages both the outer and inner conduits 24, 26 and facilitates centering and holding the upper end of the inner conduit 26 in place within the outer conduit 24, while allowing relative longitudinal movement of the outer and inner conduits 24, 26, which may be due to longitudinal compression or tension forces applied to the outer conduit.

Figure 5:
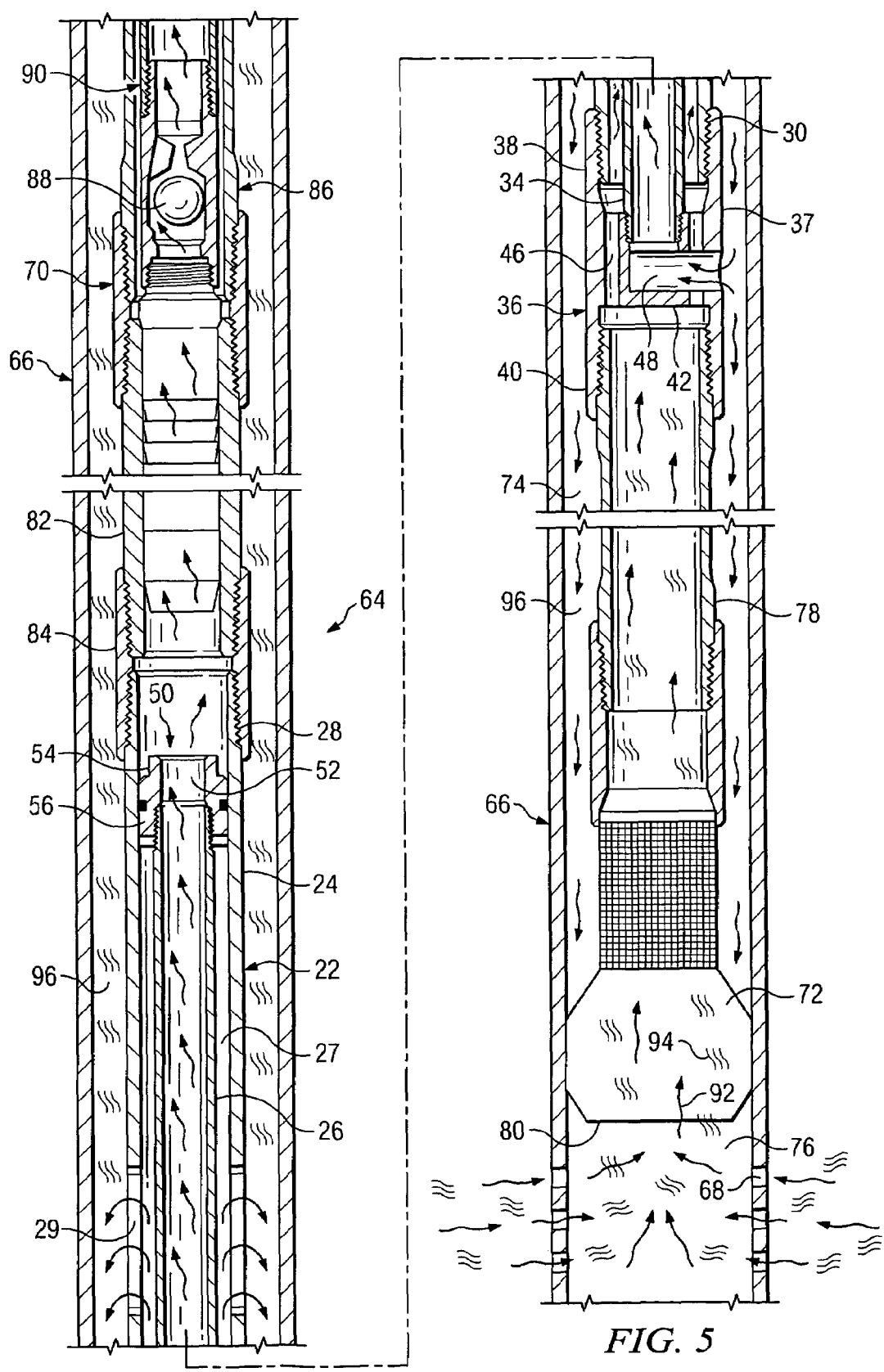
FIG. 5 is a longitudinal cross-sectional view of a wellbore of a well with a tubing string employing the separator device of FIG. 2.

Referring to FIG. 5, the separator 22 is shown in use within a wellbore 64 of a well. The wellbore 64 may be provided with a tubular casing 66 that may be perforated, such as at 68, at one or more positions along its length. The perforations 68 allow fluids from the surrounding formation to enter the casing 66. The fluids may include liquids and gases.

Positioned within the casing 66 is a tubing string designated generally at 70. The tubing string 70 may be anchored at its lower extent by a packer assembly 72. The packer assembly 72 facilitates anchoring of the tubing string 70 as well as isolating the casing 66 into upper and lower sections 74, 76, respectively. In certain embodiments, one or more packing assemblies may be provided within the casing to isolate various perforated sections of the casing 66. In such embodiments, more than one separator 22 may be employed to separate gas and liquids, as is discussed below.

Tension may be applied to the tubing string 70 from the surface, such as through a pulling unit (not shown), to exert tension on the tubing string to prevent buckling or flexing of the string. This tension may be continuously applied to the tubing string.

The packer assembly 72 is coupled to the lower end 40 of the coupling 36. The packer assembly 72 may be coupled directly to the coupling 36 or through a tubing section, such as the tubing section 78, which may include one or more couplings or other elements of the tubing string. The packer 72 is provided with an inlet 80 for introducing fluids from the lower section 76 of the casing 66 into the tubing section 78.

The upper end 28 of the outer conduit 24 is shown coupled to a seating nipple 82 through coupling 84. Coupled above the seating nipple 82 may be a pump assembly 86. In the embodiment shown, the pump assembly 86 is that of a sucker-rod pump that includes a cage and ball 88 and a pump barrel and pump 90, the components of which are conventional in design and known to those skilled in the art. Additionally, other pumps or lifting means may be employed with the tubing string for lifting liquids to the surface that are within the knowledge of those skilled in the art.

In use, fluids enter the lower section 76 of the casing 66 through perforations 68. The fluids may include liquids, indicated by the single arrows 92, and gases, indicated by the squiggled line groups 94. The fluids pass through the packer inlet 80, through tubing section 78 and through longitudinal ports 46 of the coupling midsection 42. From the ports 46, the fluids are introduced into the interior of the outer conduit 24, within the annular space 27 defined by the walls of the outer conduit 24 and the exterior of the inner conduit 26. The fluids introduced into the annular space 27 are prevented from passing through the upper end of the outer conduit 24 by the adaptor 50 and seal 60. The gases and liquids exit the interior of the outer conduit 24 through the elongated ports 29 and enter the annular space 96 defined by the casing 66 and the tubing string 70, within the upper section 74 of the casing 66.

Once introduced into the annular space 96, gases will tend to rise upwards through the casing 66, where they may be collected at the surface. Liquids will tend to fall back, as shown by the arrows 92 and create a sump area where the liquids may pool within the annular space 96 immediately above the packer 72.

Liquids from this sump area are drawn in through the transverse port 48 of the coupling 36, which may be immersed in the pooled liquid, and into the inner conduit 26. These liquids may then be pumped to the surface through the tubing string by means of the pump assembly 86.

As can be seen, the separator 22 allows the liquids and gases to be separated simply and effectively. The separator is simple in design and is not prone to failure, as in the prior art devices. This is due to the adaptor 60, which engages the inner and outer conduit to prevent lateral movement of the inner conduit, while allowing relative longitudinal movement of the inner and outer conduits. Such longitudinal movement may be the result of longitudinal compression or tension forces applied to the outer conduit through the tubing string.

Additionally, the design allows the separator to be easily disassembled for repair and replacement of separator components. Whereas, in the prior art, the inner conduit was permanently and rigidly welded to the outer conduit, the separator can be fully disassembled by unscrewing the outer and inner conduits from the coupling 26. The adaptor 50 can be unscrewed from upper end of the inner conduit and removed for replacement of seals and the like. Each of these components can be replaced with new components of similar design.

It should also be apparent that variations in the design may be provided. For example, instead of the adaptor being coupled to the inner conduit, the adaptor may be coupled to the interior of the outer conduit and be provided with a seal or seals that are located within the internal bore for engaging the sides of the inner conduit. The inner conduit is thus allowed to move longitudinally within the internal bore of the adaptor.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A gas/liquid separator assembly for use in a tubing string located in a borehole of a well, the separator assembly comprising:
    a tubular outer conduit having a lower inlet for introducing gas and liquids within the interior of the outer conduit, the outer conduit having an upper outlet to allow fluids to pass to the exterior of the outer conduit;
    a tubular inner conduit disposed within the interior of the outer conduit, the inner conduit having a flow passage and an inlet for introducing liquids discharged from the outer conduit into the flow passage, the inner and outer conduits being rigidly joined together at a first end; and
    an adaptor that engages the inner and outer conduits at a second end to prevent lateral movement of the second end of the inner conduit within the outer conduit while allowing relative longitudinal movement of the outer and inner conduits from longitudinal compression or tension forces applied to the outer conduit.

2. The separator of claim 1, wherein:
    the adaptor provides sealing engagement between the inner and outer conduits.

3. The separator of claim 1, further comprising:
    a seal that is carried by the adaptor, the seal providing sealing engagement between the inner and outer conduits.

4. The separator of claim 1, wherein:
    the inner and outer conduits are rigidly coupled together at the first end by a coupling having an outer conduit port and an inner conduit port that are isolated from one another, the outer conduit port communicating with the lower inlet of the outer conduit, and the inner conduit port communicating with the inlet of the inner conduit.

5. The separator of claim 1, wherein:
    the outer conduit includes a tubular member having helical threads on each end configured for engagement with threaded portions of the tubing string for coupling the separator thereto.

6. The separator of claim 1, wherein:
    the inner and outer conduits are each threaded on the first end and are rigidly coupled together at the first end by a coupling body having a first threaded portion for engaging the first end of the inner conduit and a second threaded portion for engaging the first end of the outer conduit, the coupling having an outer conduit port and an inner conduit port that are isolated from one another, the outer conduit port communicating with the lower inlet of the outer conduit, and the inner conduit port communicating with the inlet of the inner conduit.

7. The separator of claim 1, wherein:
    the second end of the inner conduit is threaded and wherein the adaptor has corresponding threads for securing the adaptor to the second end.

8. A gas/liquid separator assembly for use in a tubing string located in a borehole of a well, the borehole being provided with a packer assembly coupled to the tubing string for isolating upper and lower sections of the borehole, the separator assembly comprising:
    a tubular outer conduit configured for coupling to the packer assembly and tubing string and having a lower inlet for introducing fluids passed through the packer from the lower section of the borehole within the interior of the outer conduit, the outer conduit having an upper outlet spaced from the inlet to allow fluids to pass to the exterior of the outer conduit into the upper section of the borehole;
    a tubular inner conduit disposed within the interior of the outer conduit, the inner conduit having a flow passage and an inlet for introducing liquids within the upper section of the borehole into the flow passage, the inner and outer conduits being rigidly joined together at a first end;
    an adaptor that engages the inner and outer conduits at a second end to prevent lateral movement of the second end of the inner conduit within the outer conduit while allowing relative longitudinal movement of the outer and inner conduits from longitudinal compression or tension forces applied to the outer conduit, the second end of the outer conduit being smooth bored.

9. The separator of claim 8, wherein:
    the adaptor provides sealing engagement between the inner and outer conduits.

10. The separator of claim 8, further comprising:
    a seal that is carried by the adaptor, the seal providing sealing engagement between the inner and outer conduits.

11. The separator of claim 8, wherein:
    the inner and outer conduits are rigidly coupled together at the first end by a coupling having an outer conduit port and an inner conduit port, the outer conduit port communicating with the lower inlet of the outer conduit, and the inner conduit port communicating with the inlet of the inner conduit.

12. The separator of claim 8, wherein:
    the outer conduit includes a tubular member having helical threads on each end configured for engagement with threaded portions of the tubing string for coupling the separator thereto.

13. The separator of claim 8, wherein:
    the inner and outer conduits are each threaded on the first end and are rigidly coupled together at the first end by a coupling body having a first threaded portion for engaging the first end of the inner conduit and a second threaded portion for engaging the first end of the outer conduit, the coupling having an outer conduit port and an inner conduit port that are isolated from one another, the outer conduit port communicating with the lower inlet of the outer conduit, and the inner conduit port communicating with the inlet of the inner conduit.

14. The separator of claim 8, wherein:
    the second end of the inner conduit is threaded and wherein the adaptor has corresponding threads for securing the adaptor to the second end.

15. A method of separating gas and liquids in a well of a subterranean formation, the well including a borehole with a tubing string that extends from the surface to a packer assembly located within the bore hole for isolating upper and lower sections of the borehole, the method comprising:
    coupling a tubular outer conduit to the packer assembly and tubing string, the outer conduit having a lower inlet for introducing fluids passed through the packer from the lower section of the borehole within the interior of the outer conduit, the outer conduit having an upper outlet spaced from the inlet to allow fluids to pass to the exterior of the outer conduit into the upper section of the borehole;

providing a tubular inner conduit within the interior of the outer conduit, the inner conduit having a flow passage and an inlet for introducing liquids within the upper section of the borehole into the flow passage, the inner and outer conduits being rigidly joined together at a first end;

providing an adaptor that engages the inner and outer conduits at a second end to prevent lateral movement of the second end of the inner conduit within the outer conduit while allowing relative longitudinal movement of the outer and inner conduits from longitudinal compression or tension forces applied to the outer conduit, the second end of the inner conduit being threaded and wherein the adaptor has corresponding threads for securing the adaptor to the second end.

16. The method of claim 15, wherein:

tension is continuously applied to the tubing string.

17. The method of claim 15, wherein:

the adaptor provides sealing engagement between the inner and outer conduits.

18. The method of claim 15, further comprising:

providing a seal that is carried by the adaptor, the seal providing sealing engagement between the inner and outer conduits.

19. The method of claim 15, wherein:

the inner and outer conduits are rigidly coupled together at the first end by a coupling having an outer conduit port and an inner conduit port that are isolated from one another, the outer conduit port communicating with the lower inlet of the outer conduit, and the inner conduit port communicating with the inlet of the inner conduit.

20. The method of claim 15, wherein:

the outer conduit includes a tubular member having helical threads on each end configured for engagement with threaded portions of the tubing string for coupling the separator thereto.

21. The method of claim 15, wherein:

the inner and outer conduits are each threaded on the first end and are rigidly coupled together at the first end by a coupling body having a first threaded portion for engaging the first end of the inner conduit and a second threaded portion for engaging the first end of the outer conduit, the coupling having an outer conduit port and an inner conduit port that are isolated from one another, the outer conduit port communicating with the lower inlet of the outer conduit, and the inner conduit port communicating with the inlet of the inner conduit.

* * * * *